United States Patent [19]

Tomura et al.

[11] Patent Number: 6,074,449
[45] Date of Patent: Jun. 13, 2000

[54] FILTER MATERIAL CONTAINING A POLYCYANOARYL ETHER

[75] Inventors: Toshikazu Tomura, Ichihara; Tomoyoshi Murakami, Ichiharashi, both of Japan

[73] Assignee: Idemitsu Petrochemical Co., Ltd., Tokyo, Japan

[21] Appl. No.: 09/182,418

[22] Filed: Oct. 30, 1998

[30] Foreign Application Priority Data

Nov. 14, 1997 [JP] Japan ..................................... 9-313407

[51] Int. Cl.$^7$ ............................ B01D 39/08; B01D 39/16
[52] U.S. Cl. .............................. 55/361; 55/522; 55/528; 55/DIG. 45
[58] Field of Search ............................ 55/522, 524, 527, 55/528, DIG. 5, DIG. 45; 528/211

[56] References Cited

U.S. PATENT DOCUMENTS

| | | | |
|---|---|---|---|
| 4,640,974 | 2/1987 | Matsuo et al. | 528/211 |
| 4,977,234 | 12/1990 | Matsuo | 528/211 |
| 5,080,698 | 1/1992 | Krizan | 96/4 |

FOREIGN PATENT DOCUMENTS 0 445 840   9/1991   European Pat. Off. .

OTHER PUBLICATIONS

Patent Abstracts of Japan, vol. 095, No. 009, Oct. 31, 1995, UP 07 157917, Jun. 220, 1995.

*Primary Examiner*—David A. Simmons
*Assistant Examiner*—Robert A. Hopkins
*Attorney, Agent, or Firm*—Oblon, Spivak, McClelland, Maier & Neustadt, P.C.

[57] ABSTRACT

Provided is a filter favorably used in high-temperature long-term exposure conditions, for example, in coal boilers, cupola furnaces for steel and cast iron production, cement kilns, aggregate drying furnaces, furnaces for non-iron metals, etc. For the filter, provided are a filter material comprising a web or a web and its support, which contains a polycyanoaryl ether in an amount of not smaller than 5% by weight relative to the weight of the filter material; and a filter material comprising a substrate of polycyanoaryl ether fibers or of polycyanoaryl ether fibers and other organic fibers, and a web of at least one type of fibers selected from polycyanoaryl ether fibers and other organic fibers, wherein the amount of the polycyanoaryl ether fibers is not smaller than 5% by weight relative to the total weight of the substrate and the web.

7 Claims, No Drawings

FILTER MATERIAL CONTAINING A POLYCYANOARYL ETHER

FIELD OF THE INVENTION

The present invention relates to a filter material containing a polycyanoaryl ether (hereinafter referred to as PEN), which is favorable for bag filters for large-sized incinerators and for filters to be used in chemical plants, etc., and also to filters comprising it.

BACKGROUND OF THE INVENTION

Filters of polyphenylene sulfide (PPS) fibers, fluorine resin fibers or the like are widely used as dust filters for city garbage incinerators or coal boilers. Recently, those incinerators and boilers have become run at high inner temperatures for reducing the amount of dioxin to be generated therein and for increasing the processing efficiency. Therefore, the filters in those are required to have higher long-term heat resistance at high temperatures than conventional ones.

For those filters, proposed were felt of PPS fibers, and felt comprising a substrate of PPS woven fabric having a specifically defined weaving density in which the fabric substrate is sandwiched between webs (see Japanese Patent Application Laid-Open (JP-A) Hei-5-317620). Also proposed were a filter of PPS fabric of which the strength in both the weft direction and the warp direction is specifically defined (see JP-A Hei-3-32711); and a bag filter comprising composite felt of such that webs of PPS fibers are entangled around a PPS spun yarn fabric substrate (see JP-A Hei-9-57026).

However, the proposed filters are all of PPS fibers alone, and PPS has a melting point falling between 270 and 280° C. and the highest temperature for its continuous use is 200° C. in UL Standards. Therefore, their heat resistance and durability are not enough for long-term exposure to high temperatures of 200 to 230° C. or higher.

On the other hand, the particle size of dust to be generated therein is smaller with the increase in the inner temperatures of incinerators and others being run. If the conventional filter material consisting essentially of PPS fibers is modified in order to increase its dust-trapping capacity in such incinerators and others to be run at high temperatures, the air permeability through the filter is lowered, resulting in that the dust as trapped in the filter is difficult to remove and the filter is thereby often clogged.

In order to solve this problem, a filter material has been proposed, which is such that a mixture of organic fibers having a melting point of not lower than 180° C. and glass fibers having a specifically defined diameter is partly bonded (adhered) onto the dust-trapping surface of the filter material (see JP-A Hei-5-245316). Although its dust-trapping ability is good and the dust removal from it is easy, the proposed filter material is still problematic in that the organic fibers and the glass fibers around it separate each other while the filter is continuously used for a long period of time at high temperatures. In such continuous use, the dust-trapping ability of the proposed filter material is lowered and the durability thereof is poor.

SUMMARY OF THE INVENTION

The object of the present invention is to provide a filter material having the advantages of excellent long-term, high-temperature heat resistance and easy dust removal, and to provide a filter comprising it.

We, the present inventors have assiduously studied so as to attain the object, and, as a result, have found that a filter material comprising fibers of a polycyanoaryl ether meets the object. The filter comprising the filter material is free from the problems noted above.

Specifically, the invention provides the following:

(1) A filter material comprising a web and optionally its support, which is characterized by containing polycyanoaryl ether fibers in an amount of not smaller than 5% by weight relative to the total weight of the web or the web and its support;

(2) The filter material of (1), which has a degree of dry state shrinkage at 230° C. of not larger than 2.5% and a degree of dry state creep at 230° C. of not larger than 1.5%;

(3) The filter material of (1) or (2), which comprises a substrate of polycyanoaryl ether fibers or of polycyanoaryl ether fibers and other organic fibers and in which a web of polycyanoaryl ether fibers and/or other organic fibers are laid down on the substrate;

(4) The filter material of (3), wherein the other organic fibers than polycyanoaryl ether fibers are of a resin having a melting point of not lower than 250° C.;

(5) The filter material of (3), wherein the other organic fibers than polycyanoaryl ether fibers are polyarylene-sulfide fibers and/or polyether-ether ketone fibers;

(6) The filter material of any one of (1) to (5), wherein the polycyanoaryl ether fibers have a diameter of from 0.1 to 300 $\mu$m;

(7) A filter having a degree of dry state shrinkage at 230° C. of not larger than 2.5% and a degree of dry state creep at 230° C. of not larger than 1.5%, and comprising a web and optionally its support, which is characterized by containing polycyanoaryl ether fibers in an amount of not smaller than 5% by weight relative to the total weight of the web or the web and its support; and (8) A bag filter comprising the filter material of any one of (1) to (6).

DETAILED DESCRIPTION OF THE INVENTION

The filter material and the filter comprising it of the present invention are concretely described hereinunder with respect to the constitutional requirements for them.

1. Filter Material and Filter Comprising it

The filter material of the invention is an element constituting the filtering face of a filter, and is not specifically defined, so far as it comprises a web and optionally its support and contains a polycyanoaryl ether in an amount of not smaller than 5% by weight relative to the total weight of the filter material.

The polycyanoaryl ether content of the filter material of the invention is at least 5% by weight, but preferably from 5 to 70% by weight, more preferably from 10 to 50% by weight. If the content is smaller than 5% by weight, the long-term heat resistance of the filter is poor and therefore the dimensional stability thereof is also poor, thereby often resulting in that the filter in long-term continuous use will be broken. on the other hand, even if the polycyanoaryl ether content is enlarged excessively, the capabilities of the filter are not worsened. However, use of too much polycyanoaryl ether over the preferred range will be disadvantageous in view of the object of the invention which is to provide inexpensive filter materials.

Obviously, removing dust from the filter comprising the filter material, of which the polycyanoaryl ether content is not smaller than 5% by weight, is easier than that from conventional PPS fiber filters. It is considered that the reason will be because of the small kinetic friction coefficient of the polycyanoaryl ether constituting the filter material. This effect brings about the prolongation of the filter life.

The filter of the invention is employable even in severe conditions such as those for large-sized incinerators in which the ambient temperature is 200° C. or higher and the filter is continuously used for a long period of time without being exchanged with a fresh one for one year or longer. Therefore, it is desirable that the filter has a degree of dry state shrinkage at 230° C. of not larger than 2.5% and a degree of dry state creep at 230° C. of not larger than 1.5%. Overstepping the defined ranges for those parameters, the filter will be greatly deformed during use in such a high-temperature environment and will be broken.

In order to obtain the preferred filter as above, it is desirable that both the degree of dry state shrinkage at 230° C. and the degree of dry state creep at 230° C. of the filter material also fall the defined ranges as above.

In order to have high mechanical strength, preferably, the filter material of the invention is so constructed that a web is laid down on one or both surfaces of the support.

In the preferred constitution of the filter material, it is further desired that a polycyanoaryl ether exists in the support so as to prevent the mechanical strength of the filter material from being lowered while the filter material is exposed to high temperatures for a long period of time. Specifically, the polycyanoaryl ether content of the support is preferably not smaller than 5% by weight, more preferably from 5 to 70% by weight, even more preferably from 10 to 50% by weight, relative to the total weight, 100% by weight of the support. The presence of a polycyanoaryl ether in the support in an amount of not smaller than 5% by weight, more preferably not smaller than 10% by weight further augments the effect of the invention noted above. On the other hand, even if the polycyanoaryl ether content of the support is enlarged excessively, the effect is not reduced. However, use of too much polycyanoaryl ether over the preferred range will be disadvantageous in view of the object of the invention which is to provide inexpensive filter materials.

The support to be in the filter material of the invention is not specifically defined, provided that it may be combined with, for example, webs and that it is a vapor-pervious or water-pervious one. As examples of the support, mentioned are substrates of, for example, woven fabric, knitted fabric, non-woven fabric, meshed fabric and the like, as well as films and sheets with many pores to ensure the vapor-perviousness and the water-perviousness therethrough. Of those, preferred are the substrates.

As the materials for the substrates, for example, employable are PEN fibers mentioned above, and organic fibers to be mentioned below, as well as fibrous inorganic fillers such as glass fibers, stainless steel fibers, etc. Where those substrates are used as the support, however, they must contain PEN fibers. As the materials for the films and sheets with many pores, for example, employable are metals, ceramics and also synthetic resins and the like of which the heat resistance is comparable to or higher than that of PEN.

It is desirable that the webs also contain PEN fibers like the substrates. However, in the filter material comprising a web and a support where the strength of the web does not have so much influence on the strength of the filter material or where the temperature at which the filter material is used is relatively low, the web may be composed of only organic fibers except PEN fibers, for example, only polyarylene sulfide such as PPS fibers or polyether-ether ketone fibers.

The diameter of the fibers constituting the webs may be suitably determined, depending on the use and the object of the filter. For example, where the filter is intended to trap even very fine dust therein, melt-blow nonwoven fabric having a fiber diameter of not larger than 1 $\mu$m may be used for the web. On the other hand, for the filter to be in large-sized incinerators for trapping dust therein, a web having a fiber diameter of from 1 to 50 $\mu$m may be laid down on the substrate through needle-punching.

For laying down the web on the support, for example, generally employed is sewing or needle-punching. Where the support and the web are not completely adhered to each other on their entire surfaces, adhesives with good heat resistance and chemical resistance may be used for laying down the web on the support.

The structure of the web and the support is not specifically defined, so far as the web is laid down on one or both surfaces of the support. In one filter material, either one or both of the web and the support may have a multi-layered structure.

The filter of the invention is not specifically defined, and the filter material mentioned above may be formed into filters of any desired shapes in any known manner. However, preferred are bag filters as formed by shaping the filter material into bags.

2. Fibers Constituting Filter Material and Filter of it (1) Polycyanoaryl Ether (PEN) Fibers PEN fibers for use in the filter material of the invention are obtained by spinning a polymer (PEN) which comprises repeating units of the following formula (1). The molecular weight of PEN is not specifically defined. Preferably, however, PEN has a reduced viscosity (0.2 g/dl in p-chlorophenol at 60° C.) of from 0.5 to 1.5, more preferably from 0.7 to 1.3, in view of its heat resistance and shapability.

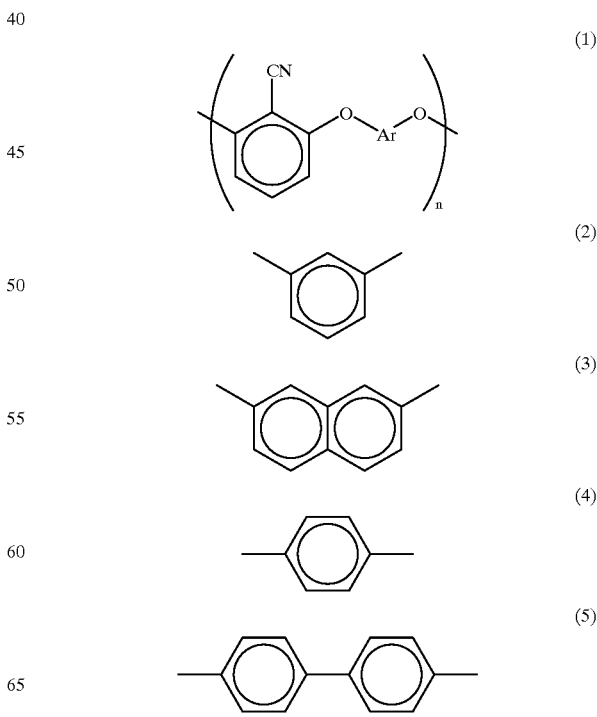

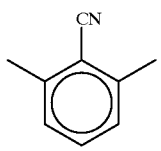

In formula (1), Ar represents an arylene group. The arylene group may have, for example, the structure of any of formulae (2) to (6) above.

The method for producing PEN fibers is not specifically defined, for which is employable any ordinary melt spinning (see, for example, JP-A Hei-6-184818). For producing fine PEN fibers having a diameter of not larger than 1 μm, also employable is melt-blowing.

The diameter of PEN fibers is not specifically defined, but preferably falls between 0.1 and 300 μm or so. PEN fibers having a diameter of larger than 300 μm are unfavorable for the reasons that their workability into substrates will be poor and their strength at high temperatures will be low. PEN fibers having a diameter of smaller than 0.1 μm are also unfavorable for the reasons that the vapor-perviousness through the fabric of the fibers will be poor, the strength of the fibers at high temperatures will be low and the producibility of the fibers will be low.

The strength of PEN fibers is desirably not smaller than 2 g/denier, when the fibers are used in the part having a great influence of the strength of the filter (generally, in the substrate of the filter).

(2) Organic Fibers

Organic fibers for use in the filter or the filter material of the invention include, for example, polyether-ether ketone (PEEK) fibers, polyarylenesulfide (PAS) fibers, polytetrafluoroethylene fibers, aramide fibers, polyimide fibers, polyester fibers, 66-nylon fibers, etc.

Since the filter and the filter material of the invention will be used at ambient temperatures falling between 200 and 230° C. or higher for a long period of time, fibers of a resin having a melting point of not lower than 250° C. are preferred in the invention. When substrates or filter materials that comprise organic fibers having a melting point of lower than 250° C. are used at high temperatures for a long period of time, their strength will be greatly lowered so that they could not be continuously used for 1 year or longer. In such long-term use, in addition, the substrates and the filter materials are aged and/or the degree of dry state shrinkage and that of dry state creep of the filter comprising them increase, thereby often resulting in that the filter is broken.

Of the fibers noted above, polytetrafluoroethylene fibers are greatly softened at ambient temperatures higher than 160° C., and, when mixed with PEN fibers and formed into filter materials, they cause interfibrous separating at such high temperatures. For these reasons, polytetrafluoroethylene fibers are unfavorable to high-temperature applications. Polyester fibers, 66-nylon fibers and aramide fibers have a melting point of not lower than 250° C., but their long-term heat-resisting temperature (UL Standards) is not higher than 200° C. Therefore, those fibers are unfavorable for dust-trapping filters and the like that shall be exposed to high-temperature atmospheres at 200° C. or higher for a long period of time.

Of the fibers noted above, preferred are PEEK fibers and PAS fibers for the reasons that their melting point and long-term heat-resisting temperature (UL Standards) are relatively high.

The diameter of the organic fibers for use in the invention is not also specifically defined, but for the same reasons as those for PEN fibers noted above, it preferably falls between 0.1 and 300 μm or so.

The invention is described in more detail with reference to the following Examples and Comparative Examples, which, however, are not intended to restrict the scope of the invention.

The tensile strength, the degree of dry state shrinkage at 230° C., the degree of dry state creep at 230° C., the degree of dust trapping and the degree of dust removal of the substrate and the filter material produced herein were measured according to the methods mentioned below, and the durability of the filter was tested according to the method mentioned below.

1. Methods for Measuring Properties of Samples (1) Tensile Strength (Substrate, Filter Material)

Samples to be tested for their tensile strength had a length of 200 mm and a width of 50 mm. Each sample was fitted in a tensile tester in such a manner that the distance between the tips of the tester gripping the sample was 10 cm, and the sample was stretched at an tensile speed of 100 mm/min at room temperature and at 230° C., according to the tensile test of JIS-L-1096A. The stress-strain curve of the filter material sample tested gave a point at which the substrate broke and a point at which the web broke. Of the two, the point at which the substrate broke is referred to for the tensile strength of the sample.

(2) Degree of Dry State Shrinkage at 230° C. (Filter Material)

Samples having a size of 400 mm×400 mm (in practice, having a size a little larger than 400 mm×400 mm) were prepared, and marked in both the warp direction and the weft direction to have 9 points in total at intervals of 200 mm. Precisely, each sample was marked at the four corners, at the middle point of each side and at the center, thereby having 9 points in total. The thus-marked samples were put on a support plate in a drier at 230° C. and left as they were thereon for 3 hours. Then, the samples were taken out of the drier, and the length between the adjacent mark points was measured. Three same samples were tested in that manner. The data were averaged, and the degree of dry state shrinkage at 230° C. of the samples was obtained according to the following equation.

$$\text{Degree of Dry State Shrinkage } (\%) = 100(L-L')/L$$

where L indicates the length (200 mm) before the heat treatment, and L' indicates the length after the heat treatment.

(3) Degree of Dry State Creep at 230° C. (Filter Material)

Samples having a length of 300 mm and a width of 50 mm were prepared, and marked in the warp direction at intervals of 200 mm. The thus-marked samples, to which was applied a load of 1 Lb, were hung in a drier, and left therein at 230° C. for 3 hours. Then, the samples were taken out of the drier, and the length between the adjacent mark points was measured. Three same samples were tested in that manner. The data were averaged, and the degree of dry state creep at 230° C. of the samples was obtained according to the following equation.

$$\text{Degree of Dry State Creep } (\%) = 100(L'-L)/L$$

where L indicates the length (200 mm) before the heat treatment, and L' indicates the length after the heat treatment.

(4) Degree of Dust Trapping (Filter Material)

Slaked lime (JIS super-special grade) was used as dust. This was filtered through each filter sample, for which the dust concentration was 10 g/m³ and the dust was blown at a speed of 3.0 m/min. The weight of the dust having been blown to the filter sample and that of the dust having passed through the filter sample before the pressure loss reached 150 mmAq were obtained. From the data, obtained was the degree of dust trapping of the sample. The pressure loss indicates a numerated value of the decrease in the downstream pressure after the filter sample through which the dust have passed, and this is the difference between the initial pressure before the test and the pressure after the test.

(5) Degree of Dust Removal (Filter Material)

Slaked lime (JIS super-special grade) was used as dust. This was filtered through each filter sample, for which the dust concentration was 10 g/m³ and the dust was blown at a speed of 3.0 m/min. After the pressure loss reached 150 mmAq, compressed air was applied to the filter sample at a speed of 5 m/min for 60 seconds in the direction opposite to the direction in which the dust had been blown to the filter sample, and the weight of the dust removed from the filter sample due to the compressed air blow was measured. From the data, obtained was the degree of dust removal of the sample.

EXAMPLE 1

PEN resin was fed into a double-screw extruder (L/D=26) having 50 nozzles (L/D=2, diameter=0.3 mm), and extruded out through the nozzle into strands. For this, the extruder temperature fell between 280 and 350° C., the nozzle package temperature was 350° C., and the nozzle temperature was 352° C. The extruder used was so constructed that the temperature of the extruder body, that of the nozzle package temperature and that of the nozzles could be separately controlled. The strands thus extruded out through the nozzles were spun at a speed of 600 m/min to give PEN fibers (fiber diameter=15 μm, fiber strength=40 kg/mm²).

Next, four threads of these fibers were twisted into 4-thread twisted yarns. These yarns were woven into plain weave fabric in which 28 yarns/2.54 cm were for the warp and 18 yarns/2.54 cm were for the weft. This fabric was heat-set at 250° C. for 1 minute under the overfeeding condition. The overfeeding was for forming the fabric into a flat one by hot pressing. The thus-processed fabric was used herein as a substrate. Its tensile strength is shown in Table 1.

A web of the PEN fibers noted above was laid down on the substrate, for which the fibers had been cut to have a length of 51 mm. The resulting substrate was needle-punched to form a filter material having an weight of about 540 g/m². Next, the web of the filter material was exposed to flames whereby the fibers of the web were partly bonded together, and thereafter the thus-processed filter material was dressed by passing it through hot rolls (rolling treatment), and then finished to have a predetermined width. The filter material was tested for the tensile strength, the degree of dry state shrinkage, the degree of dry state creep, the degree of dust trapping and the degree of dust removal, and the data obtained are shown in Table 1.

Next, the filter material was sewn into bags. The resulting bag filter was set in an exhaust gas dust collector for a coal boiler, and the boiler was run continuously. After one-year continuous running of the boiler, the condition of the bag filter was observed. The result in the pilot test is shown in Table 1. The PEN resin used herein is an RFS-grade commercial product of Idemitsu Material Co. This resin has the formula (1) in which Ar is represented by the formula (2), and this had a reduced viscosity of 1.23 g/dl.

TABLE 1

Materials and Compositions of Substrates and Webs, and Characteristics of Filter Materials

| | | Unit | Example 1 | Example 2 | Example 3 | Example 4 | Example 5 |
|---|---|---|---|---|---|---|---|
| Substrate | Material A | | PEN Fibers | PEN Fibers | PEN Fibers | PEN Fibers | PEN Fibers |
| | Composition | (wt. %) | 100 | 100 | 50 | 30 | 20 |
| | Material B | | — | — | PPS Fibers | PPS Fibers | PPS Fibers |
| | Composition | (wt. %) | — | — | 50 | 70 | 80 |
| Web | Material C | | PEN Fibers | PEN Fibers | PEN Fibers | PEN Fibers | PEN Fibers |
| | Composition | (wt. %) | 100 | 30 | 50 | 30 | 10 |
| | Material D | | — | PPS Fibers | PPS Fibers | PPS Fibers | PPS Fibers |
| | Composition | (wt. %) | — | 70 | 50 | 70 | 90 |
| | Material E | | — | — | — | — | — |
| | Composition | (wt. %) | — | — | — | — | — |
| | Total PEN Fibers in Filter Material | (wt. %) | 100 | 65 | 50 | 30 | 15 |
| Substrate | Tensile Strength (1), room temp. | kgf/5 cm | 156.2 | 156.2 | 125.6 | 113.4 | 107.2 |
| Filter Material | Tensile Strength (1), room temp. | kgf/5 cm | 154.9 | 153.8 | 124.6 | 111.2 | 106.4 |
| Substrate | Tensile Strength (1), 230° C. | kgf/5 cm | 27.8 | 27.8 | 16.3 | 12.2 | 9.9 |
| Filter Material | Tensile Strength (1), 230° C. | kgf/5 cm | 27.0 | 25.5 | 16.1 | 11.1 | 8.5 |
| Filter Material | Degree of Dry State Shrinkage (1), 230° C. × 3 hrs. | % | 1.1 | 1.5 | 1.8 | 2.1 | 2.4 |
| Filter Material | Degree of Dry State Shrinkage (2), 230° C. × 3 hrs. | % | 1.2 | 1.7 | 1.9 | 2.2 | 2.4 |
| Filter Material | Degree of Dry Heat Creep (1), 230° C. × 3 hrs. | % | 0.7 | 1.1 | 1.3 | 1.3 | 1.4 |
| Filter | Degree of Dust Trapping | % | 99.95 | 99.80 | 99.53 | 99.81 | 99.27 |

TABLE 1-continued

Materials and Compositions of Substrates and Webs, and Characteristics of Filter Materials

| | | | | | | | |
|---|---|---|---|---|---|---|---|
| Material Filter Material | Degree of Dust Removal | % | 95.67 | 91.63 | 94.98 | 90.16 | 87.81 |
| Filter Material | Durability, 230° C. × 1 year | | ○ | ○ | ○ | ○ | Δ |

| | | Unit | Example 6 | Example 7 | Example 8 | Example 9 | Compara. Example 1 |
|---|---|---|---|---|---|---|---|
| Substrate | Material A | | PEN Fibers | PEN Fibers | PEN Fibers | PEN Fibers | — |
| | Composition | (wt. %) | 10 | 30 | 30 | 50 | — |
| | Material B | | PPS Fibers | PPS Fibers | PPS Fibers | PPS Fibers | PPS Fibers |
| | Composition | (wt. %) | 90 | 70 | 70 | 50 | 100 |
| Web | Material C | | PEN Fibers | PEN Fibers | PEN Fibers | — | — |
| | Composition | (wt. %) | 5 | 90 | 20 | — | — |
| | Material D | | PPS Fibers | — | PPS Fibers | PPS Fibers | PPS Fibers |
| | Composition | (wt. %) | 95 | — | 70 | 100 | 100 |
| | Material E | | — | PEEK Fibers | PEEK Fibers | — | — |
| | Composition | (wt. %) | — | 10 | 10 | — | — |
| Total PEN Fibers in Filter Material | | (wt. %) | 7.5 | 60 | 25 | 25 | 0 |
| Substrate | Tensile Strength (1), room temp. | kgf/5 cm | 101.1 | 113.4 | 113.4 | 125.6 | 95.0 |
| Filter Material | Tensile Strength (1), room temp. | kgf/5 cm | 100.0 | 113.0 | 110.9 | 123.1 | 94.2 |
| Substrate | Tensile Strength (1), 230° C. | kgf/5 cm | 7.4 | 12.2 | 12.2 | 16.8 | 4.8 |
| Filter Material | Tensile Strength (1), 230° C. | kgf/5 cm | 6.9 | 11.5 | 10.2 | 15.2 | 4.5 |
| Filter Material | Degree of Dry State Shrinkage (1), 230° C. × 3 hrs. | % | 2.5 | 1.9 | 2.2 | 2.0 | 3.6 |
| Filter Material | Degree of Dry State Shrinkage (2), 230° C. × 3 hrs. | % | 2.5 | 2.0 | 2.1 | 2.2 | 3.5 |
| Filter Material | Degree of Dry Heat Creep (1), 230° C. × 3 hrs. | % | 1.5 | 1.3 | 1.2 | 1.3 | 2.0 |
| Filter Material | Degree of Dust Trapping | % | 99.33 | 99.93 | 99.19 | 99.02 | 98.96 |
| Filter Material | Degree of Dust Removal | % | 85.14 | 93.37 | 86.13 | 85.11 | 78.36 |
| Filter Material | Durability, 230° C. × 1 year | | Δ | ○ | ○ | Δ | X |

○ : Changed little.
Δ : Aged, but not broken.
X : Broken.
(1) : at the weft direction
(2) : at the warp direction

EXAMPLES 2 TO 9, AND COMPARATIVE EXAMPLE 1

Different types of substrates and webs were prepared, which were composed of PEN fibers and/or other organic fibers. Using those, filter materials were produced in the manner mentioned below. For the samples comprising PPS fibers, used were PPS fibers (manufactured by Teijin Ltd.) having a diameter of 14.5 μm. In the same manner as in Example 1, four threads of the fibers were twisted into 4-thread twisted yarns. The yarns of PEN fibers and those of PPS fibers were mixed in a predetermined ratio of PEN fibers/PPS fibers, and woven into plain weave fabric in which 28 yarns/2.54 cm were for the warp and 8 yarns/2.54 cm were for the weft. This fabric was heat-set at 250° C. for 1 minute, and used as a substrate. A web of PPS fibers (manufactured by Teijin Ltd.) having a diameter of 14.5 μm and a length of 51 mm was laid down on the substrate, and formed into filter materials and filters in the same manner as in Example 1. The mixing ratio of PEN fibers/PPS fibers for each sample is shown in Table 1.

For the samples comprising PEEK fibers, used were continuous PEEK fibers (manufactured by ICI Co.) having a diameter of 20 μm. The fibers were cut to have a length of 51 mm and used in webs. In the same manner as in Example 1, produced were filter materials and filters comprising the PEEK fibers. The test data of the samples of Examples 2 to 9 and Comparative Example 1 are shown in Table 1. From Table 1, it is known that the filter material and the filter of the present invention are superior to those of PPS fibers only, with respect to all the tensile strength, the degree of dry state shrinkage, the degree of dry state creep, the degree of dust trapping, the degree of dust removal and the durability.

The filter comprising the specific filter material of the invention can be continuously used for a long period of time even in severe conditions in which the filter will be exposed to high ambient temperatures of 200° C. or higher for a long period of time. The filter of the invention has a higher degree of long-term heat durability and a higher degree of dust removal than any other conventional ones. Unexpectedly, in addition, the filter of the invention is further advantageous in that its life is prolonged when used in high-temperature environments.

Therefore, the filter of the invention is favorable to industrial use, for example, in coal boilers, cupola furnaces for steel and cast iron production, cement kilns, aggregate drying furnaces, furnaces for non-iron metals, etc. In addition, it may also be used in city garbage incinerators. In particular, it is favorable for dust filters and bag filters.

While the invention has been described in detail and with reference to specific embodiments thereof, it will be apparent to one skilled in the art that various changes and modifications can be made therein without departing from the spirit and scope thereof.

What is claimed is:

1. A filter material comprising a web or a web and its support, which contains a polycyanoaryl ether in an amount of not smaller than 5% by weight relative to the weight of said filter material, which has a degree of dry state shrinkage at 230° C. of not larger than 2.5% and a degree of dry state creep at 230° C. of not larger than 1.5%.

2. A filter material comprising a substrate of polycyanoaryl ether fibers or of polycyanoaryl ether fibers and other organic fibers, and a web of at least one type of fibers selected from polycyanoaryl ether fibers and other organic fibers, wherein the amount of the polycyanoaryl ether fibers is not smaller than 5% by weight relative to the total weight of the substrate and the web, wherein the other organic fibers than polycyanoaryl ether fibers are of a resin having a melting point of not lower than 250° C., and wherein the other organic fibers than polycyanoaryl ether fibers are of at least one type selected from polyarylenesulfide fibers and polyether-ether ketone fibers.

3. A filter material comprising a substrate of polycyanoaryl ether fibers or of polycyanoaryl ether fibers and other organic fibers, and a web of at least one type of fibers selected from polycyanoaryl ether fibers and other organic fibers, wherein the amount of the polycyanoaryl ether fibers is not smaller than 5% by weight relative to the total weight of the substrate and the web, wherein the polycyanoaryl ether fibers have a diameter of from 0.1 to 300 $\mu$m.

4. A bag filter comprising the filter material of claim 1.

5. A dust filter comprising the filter material of claim 1.

6. A bag filter comprising a filter material comprising a substrate of polycyanoaryl ether fibers or of polycyanoaryl ether fibers and other organic fibers, and a web of at least one type of fibers selected from polycyanoaryl ether fibers and other organic fibers, wherein the amount of the polycyanoaryl ether fibers is not smaller than 5% by weight relative to the total weight of the substrate and the web.

7. A dust filter comprising a filter material comprising a substrate of polycyanoaryl ether fibers or of polycyanoaryl ether fibers and other organic fibers, and a web of at least one type of fibers selected from polycyanoaryl ether fibers and other organic fibers, wherein the amount of the polycyanoaryl ether fibers is not smaller than 5% by weight relative to the total weight of the substrate and the web.

* * * * *